Sept. 15, 1970
F. C. CALVANO
3,528,214
HEAT-SEALING APPARATUS
Filed June 24, 1968
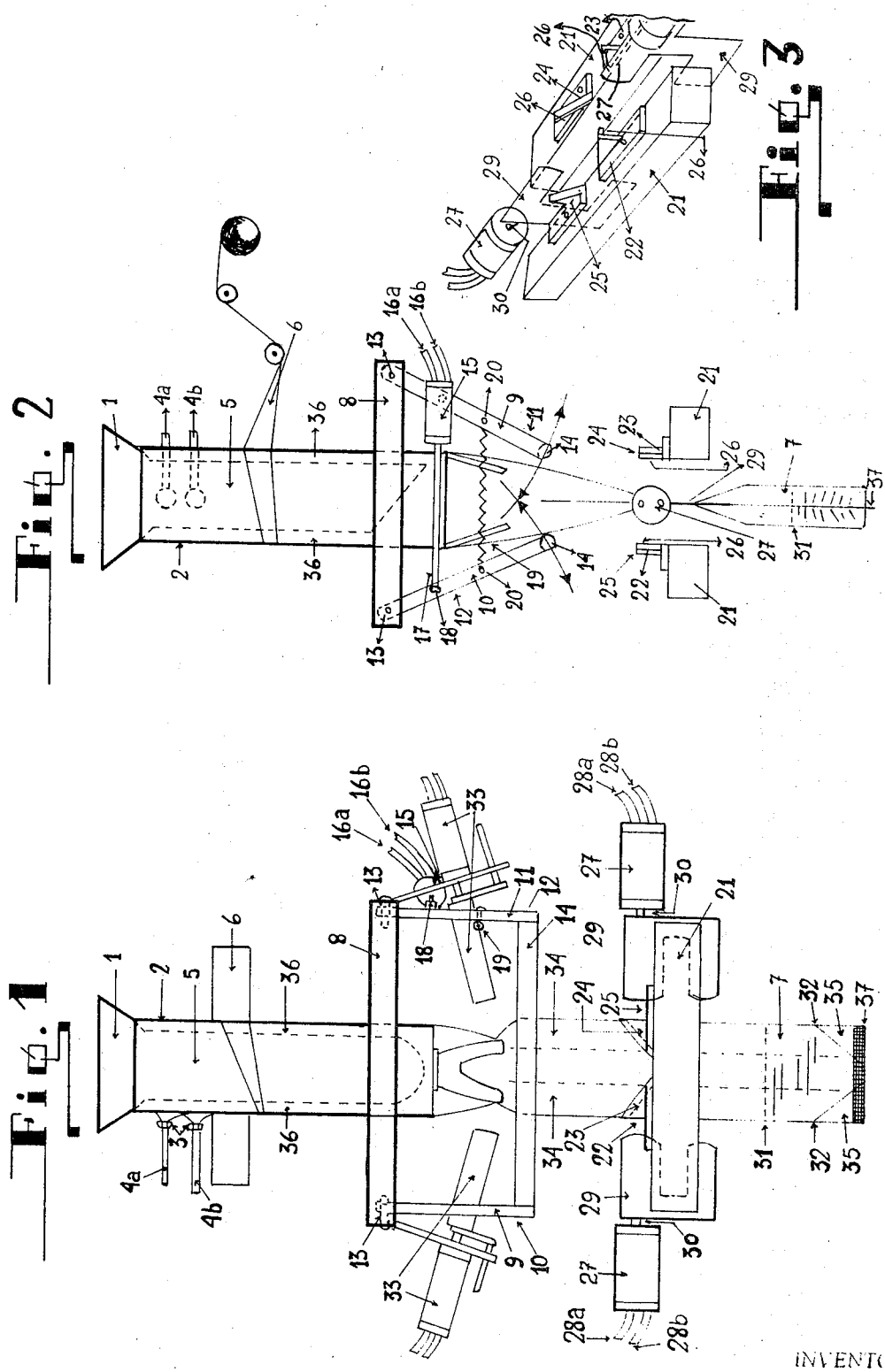
INVENTOR
Ferruccio Carmelo CALVANO
BY *Abraham C. Saffitz*
ATTORNEY United States Patent Office 3,528,214
Patented Sept. 15, 1970

3,528,214
HEAT-SEALING APPARATUS
Ferruccio C. Calvano, Buenos Aires, Argentina, assignor to Mainar S.A. Industrial Inmobiliaria Financiera Agricola Ganadera, Buenos Aires, Argentina, a corporation of Argentina
Filed June 24, 1968, Ser. No. 739,336
Claims priority, application Argentina, July 17, 1967, 160,702
Int. Cl. B65b 31/00, 9/12
U.S. Cl. 53—112      6 Claims

ABSTRACT OF THE DISCLOSURE

A heat-sealing apparatus for machines for automatically packaging powdered or like material, of the type comprising a charging hopper located at the top of an inner upstanding tube for feed material to be packaged, an outer container-forming tube, a pair of juxtaposed strips for forming opposed pleats in said container, and a heat-sealing assembly including a pair of sealing jaws. The heat-sealing assembly further comprises two pairs of flanged teeth-like sealing members mounted on the top surface of the sealing jaws, the flanges on said sealing members being aligned with the sealing faces of the respective jaws, and a double-action strip member movable between each opposing pair of sealing member flanges, the apparatus being controlled by electro-pneumatic means.

---

This invention relates to improvements in sealing apparatus for use in automatic packaging machines, particularly in machines for packaging powdered or finely crystallized products.

Various types of devices are known and used for sealing packages containing products such as those mentioned above. However, these known devices have a common disadvantage; namely, that after the packages are filled and sealed, the base or bottom of the package, instead of being flat as is desirable, becomes arcuate or rounded so as to prevent the package from standing in upright position. Furthermore, the inherent spreading or thinning of the packaging material weakens the bottom to such an extent that it causes the package to fracture with a resulting loss of both the container and the contents.

Also, difficulties are experienced in accurately filling packages with the known automatic machines, especially in continuously packaging a powder of low specific gravity material, because a small portion of the powder will remain suspended in the air or in the charging tube to cause a slight decrease in the exact weight of the contents and to detract from the efficiency of the sealing step carried out under heat and pressure.

Automatic or semi-automatic packaging machines meter predetermined quantities of the product. Generally, the same machine forms as well as fills the containers from a supply of synthetic plastic material or cellophane. The flexible packaging material is supplied in rolls or in ribbon form, and the unwound web is passed onto a container-forming tube. The container material is first sealed at the bottom end, then filled with a metered quantity of material and finally sealed at the top end and cut off from the rest of the web.

As mentioned above, the main difficulties are in the deformation and fracture of the container and in the loss of the contents resulting therefrom because the the contents do not settle quickly to the bottom which causes the bottom to assume an arcuate or rounded shape.

Attempts have been made to solve this problem by flattening the bottoms of the filled containers by hand, but this method is tedious and time-consuming and adds considerably to the cost.

The aforesaid drawbacks are overcome completely in a practical, simple and fully automatic manner by means of the improved package-sealing apparatus of the present invention.

The sealing apparatus according to the present invention, particularly adapted for use in automatic machines for packaging powdered materials or the like, comprises a pair of rollers fixed to four bars which, in turn, converge towards an upper support provided with a connecting pivot pin between the roller-supporting bars. The four bars are connected to a cylinder which may be operated pneumatically and to a resilient element, such as a coil spring, for compensating for the movement of the four bars by the cylinder. The cylinder has an inlet and an outlet for the actuating fluid.

On the top of the usual sealing jaws and fixed thereto by any suitable means, such as screws, there are provided four teeth-like members which are preferably triangular in profile and which are disposed in pairs on each sealing jaw and opposite to each other. These teeth-like members, hereinafter called teeth, each have an oblique flange at an angle of about 45°, the free edge of this flange being aligned with the sealing face of the respective jaw while the remaining portion of the tooth is disposed slightly inwardly of said face, whereby only the oblique flanges become operative for sealing, when heated by the sealing jaws, in order to seal the container material structurally at the predetermined angles.

A pair of double-acting strip members are provided on the sealing jaw assembly and these are operated by means of pneumatic cylinders.

A pair of nipple-type screws are inserted into the upper portion of the product charging tube. One of these screws is connected to a conduit leading from a suitable air pressure source to admit compresed air into this tube, while the other screw is connected to a conduit leading to a vacuum source for later removing the air.

In order that the invention may be more clearly understood and readily carried out in practice, a preferred embodiment is illustrated by way of example in the accompanying drawings, in which:

FIG. 1 is a front elevational view of a preferred embodiment of the present invention;

FIG. 2 is a diagrammatic side view of the apparatus shown in FIG. 1 with certain parts omitted for simplification; and FIG. 3 is a perspective view of the sealing jaw assembly.

The same reference characters are used to designate like or corresponding parts throughout the various figures.

Referring first to FIG. 1, the reference numeral 1 designates a funnel or hopper located over a container-forming tube 2 which is provided with a pair of nipple-type injection screws 3 to which are connected respective conduits 4a and 4b. Within the tube 2 there is provided a second tube 5 through which the powdered material to be packaged falls.

The reference numeral 6 designates the web material suitable for forming the container 7, while 8 designates a support which is connected to the four bars 9, 10, 11 and 12 by means of four pivot pins 13, the pivot pins permitting the oscillating movement of the four bars. Connected to the lower portions of these four bars is a pair of fixed rollers 14, one in back and one in front.

As shown in FIG. 2, on the bar 9 there is fixedly mounted a cylinder 15, fed by two conduits 16a and 16b, with the actuating rod 17 being connected to the bar 10 by connecting pin 18.

The aforesaid bars 9 and 10 are connected to each other by a coil spring 19, connected thereto by pins 20.

The container sealing jaws 21, which are shown schematically in FIG. 2 in an intermediate inoperative position, have fixed thereto by screws four teeth 22, 23, 24 and 25 having flanges 26. The inner front portions of the flanges are aligned with the sealing faces of the jaws 21. FIG. 3 shows the arrangement of the teeth 22–25 and actuation of rods 30 in the pair of cylinders 27, pneumatically supplied by conduits 28a and 28b (see FIG. 1). The rods 30 and the cylinders actuate the double-action strips 29.

In the views of FIGS. 1 and 2, the horizontal dotted line 31 in the container 7 shows the charge of the product in the container, while the oblique lines 32 indicate the sealing lines formed by flanges 26.

The folding strips and the operating systems 33 therefor are not described in detail since the forming of the folds 34 (FIG. 1) is well-known in the art.

The sealed spaces between the lower angles of the container 7 and the oblique sealing lines 32 are shown at 35. The reference numeral 36 designates the space between the inner face of the tube 2 and the outer face of the tube 5. The seal at the bottom of the container is designated by the reference numeral 37, this numeral applying also to the seal at the top of the preceding container which has been filled for detachment.

The movement of the jaws 21 is upwardly and downwardly during automatic packaging. The full travel of the movement is determined by the height of the container. In the upward movement, the jaws are open, and when they reach the end of their downward movement they are closed. The closing movement seals the bottom of the container and, at the same time, the unwound web material is drawn downwardly. Therefore, as the container-forming web material is moved downwardly over the tube 2, the operating mechanism strips 33 exert pressure on the sides of the web material and form opposite inward bellow-like pleats. At the same time, the cylinder 15 exerts pressure on the bars 10 and 9 to keep them in spaced relation to each other. The pressure of the cylinder 15 overcomes the resistance of the coil spring 19 and the spring is released, after which the fixed rollers 14 become juxtaposed. The juxtaposed rollers 14 press the container material while the web is being moved downwardly and this pressing motion reinforces the pleats 34.

As explained above, during their downward movement, the sealing jaws formed the seal 37 simultaneously at the upper portion of a filled container to be detached and at the bottom portion of the next container to be filled. At the same time, the flanges 26 of the teeth 22, 23, 24 and 25 form the oblique seals 32 on both sides of the container 7. The pleats 34 form four layers of container material. The upper portions of the double-action strips 29 are driven by cylinders 27 and are inserted between these four layers to separate them into double layers. The aforesaid oblique seals 32 are formed only in the outer walls of the container and not in the intermediate regions.

The strips 29 are double-acting since their lower portions are inserted in the already sealed container to reform the pleat which was undone or unfolded as the container was filled. The double-acting function is carried out at the same time that the upper portions of the strips separate the four layers into double layers.

At the end of the downward travel of the sealing assembly, the rod 17, urged by the cylinder 15 fed through the conduit 16a, causes the simultaneous separation of the fixed rollers 14 and the opening of the jaws 21. The double-action strips 29 are removed from the pleats or folds 34, whereupon the product to be packaged, already metered, falls through the tube 5 and is deposited by gravity in the container 7, without filling the space 35. By this method, some of the product remains suspended inside the tube 2 and in the upper portion of the container 7, which is still open. Air under pressure, capable of settling the suspended product, is caused to enter the space 36 through the conduit 4a of the injection nipple 3, whereby the product is deposited on the bottom of the container 7, the bottom thus remaining in a flat condition. When this occurs, a low vacuum is applied to the nipple 3 through the conduit 4b and this suctions the surplus air.

The sealing jaw assembly then starts its upward travel and, upon reaching a predetermined height, closes the just-filled container with an effective seal, whereafter a new cycle is started.

Preferably, the seals are formed with critical, pre-established heat coefficients applied to the sealing jaws.

Having thus described the invention and the means for carrying it into practice, it should be understood that changes and/or modifications in the structural details of the sealing apparatus of the present invention may occur to those skilled in the art without departing from the scope set forth in the appended claims.

What is claimed is:

1. In a heat-sealing apparatus, particularly for use in machines for automatically packaging material in bulk, or the type comprising charging hopper or funnel at the top of an inner upstanding tube for feeding material to be packaged, and outer container-forming tube, a pair of juxtaposed strips for forming opposed pleats in said container and a heat-sealing assembly including a pair of sealing jaws, the improvement comprising two pairs of flanged teeth-like sealing members, each pair fixed to the top surface of each of said sealing jaws, said sealing member flanges being aligned with the front faces of said jaws, and a double-action strip between each opposing pair of said sealing members, said strips being adapted to be inserted between said sealing member flanges in the sealing position thereof.

2. In a heat-sealing apparatus, particularly for use in machines for automatically packaging powdered material and the like, of the type comprising a charging hopper located at the top of an inner upstanding tube for feeding material to be packaged, an outer container-forming tube, a pair of juxtaposed strips for forming opposed pleats in said container, and a heat-sealing assembly including a pair of movable sealing jaws, the improvement comprising two pairs of flanged teeth-like sealing members, each pair mounted on the top surface of each of said sealing jaws, said sealing member flanges being aligned with the front faces of said jaws, a double-action strip member between each opposing pair of said sealing members; said strip members being adapted to be inserted between said sealing member flanges in the sealing position thereof, and a pair of nipples extending outwardly from the upper outer portion of said container-forming tube, one of said nipples having means for connection with a source of air under pressure, and the other of said nipples having means for connection with a source of low vacuum.

3. A heat-sealing apparatus according to claim 1, wherein each of said double-action strips is operable by a cylinder and piston assembly.

4. A heat-sealing apparatus according to claim 1, wherein each of said teeth-like members is substantially triangular in contour and has an inwardly directed flange the free edge of which is aligned with the sealing face of the respective sealing jaw.

5. A heat-sealing apparatus according to claim 2, wherein said double-action strip members are each operable by means of a pneumatic cylinder and piston arrangement.

6. In a heat-sealing apparatus, particularly for use in machines for automatically pakaging material in bulk, of the type comprising a charging hopper located at the top of an inner upstanding tube for feeding material to be packaged, an outer container-forming tube, a pair of juxtaposed strips for forming opposed pleats in said container, and a heat-sealing assembly including a pair of sealing jaws, the improvement comprising two pairs of flanged teeth-like sealing members, each pair being fixed to the top surface of each of said sealing jaws, said sealing member flanges being aligned with the front faces of the respective jaws, a double-action strip member between each opposing pair of said sealing members, said strip members being adapted to be interposed between said pairs of sealing member flanges in the sealing position thereof, and a frame mounted on the lower outer portion of said container-forming tube and provided with four oscillating bars connected to a pair of juxtaposed rollers and controlled by a pneumatic cylinder and piston assembly, governed by a coil spring member.

References Cited

UNITED STATES PATENTS

| 3,263,391 | 8/1966 | Wallsten | 53—28 |
| 3,318,067 | 5/1967 | Grafingholt | 53—112 |
| 3,353,327 | 11/1967 | Cutler et al. | 53—28 |
| 3,426,499 | 2/1969 | Paige | 53—180 X |

TRAVIS S. McGEHEE, Primary Examiner

U.S. Cl. X.R.

53—180